US011230915B2

(12) United States Patent
Dusterhoft et al.

(10) Patent No.: US 11,230,915 B2
(45) Date of Patent: Jan. 25, 2022

(54) METHOD TO DETERMINE ADJACENT WELL COMMUNICATION

(71) Applicant: Halliburton Energy Services, Inc., Houston, TX (US)

(72) Inventors: Ronald Glen Dusterhoft, Katy, TX (US); Mikko Jaaskelainen, Katy, TX (US); Stanley V. Stephenson, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 231 days.

(21) Appl. No.: 16/535,990

(22) Filed: Aug. 8, 2019

(65) Prior Publication Data

US 2021/0040841 A1 Feb. 11, 2021

(51) Int. Cl.
*E21B 47/06* (2012.01)
*G01V 8/16* (2006.01)
*G01V 99/00* (2009.01)
*E21B 47/135* (2012.01)

(52) U.S. Cl.
CPC ............ *E21B 47/06* (2013.01); *E21B 47/135* (2020.05); *G01V 8/16* (2013.01); *G01V 99/005* (2013.01)

(58) Field of Classification Search
CPC ........ E21B 47/06; E21B 47/135; E21B 47/00; G01V 99/005; G01V 8/16; G01V 1/208; G01V 1/226; G01V 1/42; G01V 2210/646; G01V 2210/644; G01V 2210/1234; G01V 2210/1429
See application file for complete search history.

(56) References Cited

U.S. PATENT DOCUMENTS

| 7,516,793 B2 | 4/2009 | Dykstra |
| 9,658,357 B2 | 5/2017 | Kabannik et al. |
| 2016/0258267 A1 | 9/2016 | Payne et al. |

OTHER PUBLICATIONS

Sahdev et al., Coiled Tubing Deployed Fiber Optics Utilized in Observing Cross-Well Communication During Stimulation, Aug. 1-3, 2016, Unconventional Resources Technology Conference (URTeC), San Antonio, Texas, pp. 1-26 (Year: 2016).*
One Petro Search Results, May 5, 2021, 11 pp. (Year: 2021).*

* cited by examiner

*Primary Examiner* — Toan M Le
(74) *Attorney, Agent, or Firm* — John Wustenberg; Baker Botts L.L.P.

(57) ABSTRACT

The present disclosure relates to systems and methods for treating subterranean formations through adjacent well communications. A method to determine well communication, comprises generating one or more pressure excitation signals via an electrical pump in a first well, wherein the one or more pressure excitation signals produce one or more response signals based on the one or more pressure excitations signals interacting with a subterranean formation; measuring the one or more response signals through transmission of the one or more response signals to a second well with a fiber optic cable, wherein the one or more response signals are measured as time-series data; determining a formation response by processing the one or more response signals with an information handling system; determining a well parameter via one or more sensors; and performing a treatment operation to mitigate well interference between the first well and the second well.

19 Claims, 4 Drawing Sheets

METHOD TO DETERMINE ADJACENT WELL COMMUNICATION

BACKGROUND

The present disclosure relates to systems and methods for treating subterranean formations through adjacent well communications.

Wells in hydrocarbon-bearing subterranean formations often require stimulation to produce hydrocarbons at acceptable rates. One stimulation treatment of choice is hydraulic fracturing treatments. In hydraulic fracturing treatments, a fracturing fluid, which can also function as a proppant carrier fluid, is pumped into a producing zone at a rate and pressure such that one or more fractures are formed and/or extended in the zone. Typically, proppant particulates suspended in a portion of the fracturing fluid are deposited in the fractures. These proppant particulates help prevent the fractures from fully closing so that conductive channels are formed and maintained such that the produced hydrocarbons can flow at economic rates.

Other methods of increasing productivity include drilling additional wells in the subterranean formation. In some instances, a new well may be drilled between other existing wells and may reduce the well spacing of the field. In other cases, field development may be planned such that multiple wells may be placed in a close proximity to accelerate recovery.

When wells are placed sufficiently close together, stimulation of one well may impact production of other wells if fluid communication between the wells is present. This may be referred to generally as "well bashing" or "frac hits," and this loss of production occurs because the stimulated well is in fluid communication with one or more of the producing wells and the treatment fluids used in the stimulated well may enter the other wells through connecting flow paths in the fracture networks within the subterranean formation. When two wells are in fluid communication, stimulation treatment fluids may be lost through flow into the non-stimulated well. If this occurs, the stimulation operation may require more stimulation treatment fluids than would be necessary if there was no fluid communication with other wells. This may result in increases in operation time and expenditure. Further, if the non-stimulated well is producing, well production may be reduced or lost due to the inflow of the stimulation treatment fluids into the producing well. In situations in which fluid communication is established between multiple producing wells the fluid used to displace the hydrocarbons may take the path of least flow resistance and may bypass reserves in low permeability areas and instead flow into another producing well leading to a loss in production in both producing wells.

BRIEF DESCRIPTION OF THE DRAWINGS

These drawings illustrate certain aspects of some of the embodiments of the present disclosure and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates to systems and methods for treating subterranean formations through adjacent well communications. More particularly, the present disclosure relates to systems and methods for electrical pumps to produce one or more pressure excitation signals in a treatment well that may be measured and interpreted in an adjacent well.

Treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, any suitable components of the fluid may be metered directly into a base fluid to form the fluid or solution. In certain embodiments, a base fluid may be mixed with the other suitable components of the treatment fluid (for example, proppant materials, gelling agents, friction reduction agents and/or any optional additives) at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids may be prepared, either in whole or in part, at an offsite location and transported to the site where the treatment or operation is conducted. In introducing a treatment fluid into a portion of a subterranean formation, the components of the treatment fluid may be mixed together at the surface and introduced into the formation together, or one or more components may be introduced into the formation at the surface separately from other components such that the components mix or intermingle in a portion of the wellbore to form a treatment fluid prior to entering the formation. In either such case, the treatment fluid is deemed to be introduced into at least a portion of the subterranean formation for purposes of the present disclosure.

The present disclosure provides methods for using the treatment fluids to carry out subterranean treatments in conjunction with a variety of subterranean operations, including but not limited to, hydraulic fracturing operations, fracturing acidizing operations to be followed with proppant hydraulic fracturing operations, and the like. In certain embodiments, a treatment fluid may be introduced into a subterranean formation. In some embodiments, the treatment fluid may be introduced into a wellbore that penetrates a subterranean formation. The subterranean formations treated may comprise any type of rock, including but not limited to ultra-tight sandstone, shale, carbonate, coal, shale muds, laminated sand/shale, and any combination thereof.

In certain embodiments involving fracturing treatments, a treatment fluid may be introduced at a pressure sufficient to create or enhance one or more fractures within the subterranean formation (for example, hydraulic fracturing) and/or to create or enhance and treat microfractures within a subterranean formation in fluid communication with a primary fracture in the formation. In other embodiments, the methods and compositions of the present disclosure may be used to treat pre-existing fractures, or fractures created using a different treatment fluid. In certain embodiments, a treatment fluid may be introduced at a pressure sufficient to create or enhance one or more fractures within the formation, and one or more of the treatment fluids comprising a proppant material subsequently may be introduced into the formation.

In one or more embodiments of the present disclosure, an environment may utilize an information handling system to control, manage or otherwise operate one or more operations, devices, components, networks, any other type of system or any combination thereof. For purposes of this disclosure, an information handling system may include any instrumentality or aggregate of instrumentalities that are configured to or are operable to compute, classify, process, transmit, receive, retrieve, originate, switch, store, display, manifest, detect, record, reproduce, handle, or utilize any form of information, intelligence, or data for any purpose, for example, for a maritime vessel or operation. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data, instructions or both for a period of time. Computer-readable media may include, for example, without limitation, storage media such as a sequential access storage device (for example, a tape drive), direct access storage device (for example, a hard disk drive or floppy disk drive), compact disk (CD), CD read-only memory (ROM) or CD-ROM, DVD, RAM, ROM, electrically erasable programmable read-only memory (EEPROM), and/or flash memory, biological memory, molecular or deoxyribonucleic acid (DNA) memory as well as communications media such wires, optical fibers, microwaves, radio waves, and other electromagnetic and/or optical carriers; and/or any combination of the foregoing.

The terms "couple" or "couples," as used herein are intended to mean either an indirect or direct connection. Thus, if a first device couples to a second device, that connection may be through a direct connection, or through an indirect electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connection.

Figure 1:
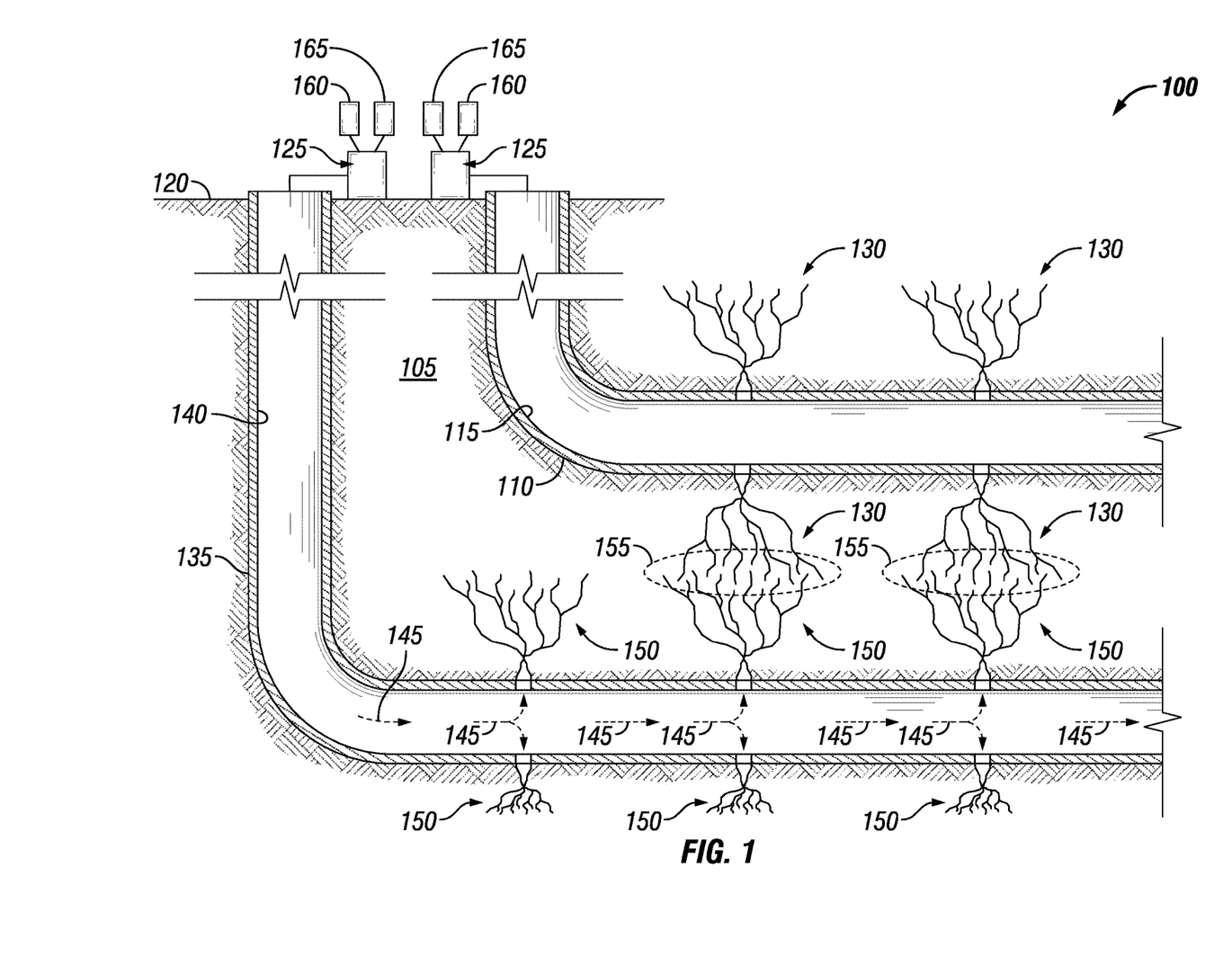
FIG. 1 illustrates a multi-lateral well system in a subterranean formation, in accordance with one or more embodiments of the present disclosure.

FIG. 1 illustrates a cross-section of a two (multiple) horizontal wells in a well system 100 in a subterranean formation 105. As illustrated, a first well 110 may comprise a production string 115 disposed within and descending from a surface 120 into the first well 110. A pump and mixer system 125 may be coupled to the production string 115 to pump treatment fluids into the first well 110. In embodiments, there may be a plurality of pump and mixer systems 125 disposed about the surface 120 coupled to individual wells. The production string 115 may include coiled tubing, jointed pipe, other structures and any combination thereof configured to convey a treatment fluid into the first well 110. Without limitations, the production string 115 may include flow control devices, bypass valves, fracturing tools, ports, and/or other tools or well devices that are capable of controlling the flow of a treatment fluid from the interior of the production string 115 into the subterranean formation 105.

In the illustrated example, the first well 110 has been drilled and stimulated to produce a plurality of first fracture networks 130. A second well 135 may additionally be drilled through the subterranean formation 105. The second well 135 may be drilled prior to, subsequent to, or at the same time as the first well 110. The terms "first" and "second" are merely used to distinguish wells from one another and do not imply any order of creation. In embodiments, the "first" or "second" well may be a treatment well while the other is an observation well. The "first" and "second" wells may be disposed in proximity to and/or adjacent to each other. The second well 135 may comprise a work string 140 disposed within and descending from the surface 120 into the second well 135. As illustrated, there may be another pump and mixer system 125 allocated to the second well 135, wherein the pump and mixer system 125 may be coupled to the work string 140 to pump treatment fluids into the second well 135. In embodiments, the pump and mixer systems 125 individually coupled to the first well 110 and the second well 135 may be coupled to each other. In alternate embodiments, the pump and mixer systems 125 individually coupled to the first well 110 and the second well 135 may be separate units and operate independent of each other. The work string 140 may include coiled tubing, jointed pipe, other structures and any combination thereof configured to convey a treatment fluid into the second well 135. Without limitations, the work string 140 may include flow control devices, bypass valves, fracturing tools, ports, and/or other tools or well devices that are capable of controlling the flow of a treatment fluid from the interior of the work string 140 into the subterranean formation 105. For example, the work string 140 may include fracturing tools (not illustrated for clarity of illustration) which comprise ports adjacent to an interior of the second well 135 to apply a treatment fluid directly onto the desired area of subterranean formation 105. The work string 140 may also include ports that are spaced apart from the interior of the second well 135 to convey a treatment fluid into an annulus (not illustrated) in the second well 135 between the work string 140 and the interior of the second well 135.

In the illustrated example, a stimulation treatment fluid 145, as represented by the arrows, may be introduced into the second well 135 at a fracture gradient above the fracture pressure of subterranean formation 105 to create or enhance one or more second fracture networks 150. An example of the stimulation treatment fluid 145 may be a pad fluid. If a first fracture network 130 is formed sufficiently close to a second fracture network 150, fluid communicating flow paths may be formed in a far field region 155 of the first fracture network 130 and the second fracture network 150 such that there is fluid pressure communication and/or flow between the first fracture network 130 and the second fracture network 150. In one or more embodiments, direct flow may not be detected in the adjacent well, but pressure signals may still be received from a neighboring well. The far field region 155 of a fracture network may be the region of the fracture network farthest from the wellbore from which the fracture network was formed and also the region closest to any other nearby wellbores. In areas of subterranean formation 105 where fluid communicating pressure and/or flow paths may be formed between a first fracture network 130 and a second fracture network 150, the far field region 155 of the first fracture network 130 and the second fracture network 150 may overlap as illustrated in FIG. 1. If fluid communicating pressure and/or flow paths are formed between the first fracture network 130 and the second fracture network 150, the stimulation treatment fluid 145 may enter the first fracture network 130 from the second fracture network 150 through the fluid communicating pressure and/or flow paths. The stimulation treatment fluid 145 may then be produced in the first well 110. Such a result will be defined herein as "well interference." Production of the stimulation treatment fluid 145 in the first well 110 may result in a reduction in the production of hydrocarbons in the first well 110. Further, stimulation of the second well 135 may require additional volumes of stimulation treatment fluid 135 to stimulate second well 135 successfully.

In embodiments, each one of the pump and mixer systems 125 may comprise an electrical pump 160, wherein the electrical pump 160 is configured to operate with low noise. During operations, the noise produced by the electrical pumps 160 may be isolated through active noise cancellation techniques such as, but not limited to, active feedforward noise control, signal processing, and/or combinations thereof. With reference to FIG. 1, the electrical pump 160 of the pump and mixer system 125 coupled to the second well 135 may be operable to generate one or more pressure excitation signals on the treatment fluid 145. The electrical pump 160 may generate the one or more pressure excitation signals before, during, after treatment and any combination thereof of the designated well. The one or more pressure excitation signals may generate constructive and/or destructive signal interference. In embodiments, the one or more pressure excitation signals may produce response signals that may be measured within the second well 135, in the first well 110, in another adjacent well disposed a certain distance from the second well 135, and any combinations thereof. The response signals may be measured by reflection and/or transmission. In one or more embodiments, the second well 135 may be a treatment well, and the response signals may be measured by reflection in the second well 135. In these embodiments, the first well 110, an adjacent well, may measure the response signals by transmission. One of ordinary skill in the art should take note that while the aforementioned embodiment describes the electrical pump 160 operating on the second well 135, it is within the scope of the disclosure for the electrical pump 160 to generate one or more pressure excitation signals on the first well 110 and/or another adjacent well rather than, or in conjunction with, the second well 135. Further, the pump and mixer systems 125 may comprise electrical blenders 165 and/or other electrical surface equipment in addition to the electrical pump 160 wherein the electrical blenders 165 and/or other electrical surface equipment may be configured to generate the one or more pressure excitation signals rather than, or in conjunction with, the electrical pump 160.

The one or more pressure excitation signals may generate one or more response parameters (for example, one or more pressure reflections) in the second well 135. In embodiments, the pressure reflections may be acoustic reflection off a discontinuity in the flow path. The pressure reflections may also be due to a sudden connection to an increased volume when a fracture from the first well 110 connects to the second well 135. In other embodiments, the one or more pressure excitation signals may generate one or more response parameters (for example, one or more pressure transmission events) observed from the second well 135 to the first well 110 (or another adjacent well). In embodiments, the amplitude of the pulses generated as one or more pressure excitation signals in the second well 135 may increase when there is connection with the first well 110. The phase angle of the waves transmitted to the first well 110 may change as the connected volume between the wells increases. The one or more pressure excitation signals may generate one or more time-variant responses (for example, one or more response signals, one or more response parameters, and/or differences in amplitude or frequency) in, but not limited to, microseismic events, acoustics, strain and/or temperature changes due to the fluid flow as the pressure excitation signals propagate through the subterranean formation 105. Without limitations, a pressure excitation signal may comprise a step change in pressure, a time-variant gradual pressure change with varying periodicity, a pressure pulse train with varying delay between pressure pulses, a pressure change induced by a change of a composition (for example, proppant, diverter, chemicals) of the treatment fluid being pumped, and any combinations thereof. As disclosed, a pulse train may be a non-sinusoidal waveform that is periodic with asymmetrical waves. In one or more embodiments, the pulse train may be customized to the one or more response parameters. For example, a pressure pulse train is indicative of where a first pulse reflects off a fracture plug (not shown) to constructively interfere with a second pulse at a pre-determined distance from the fracture plug, wherein there is repeating constructive interference. As disclosed, constructive interference may be the interaction of at least two waves being in phase with one another to produce a resultant wave with a greater amplitude. In one or more embodiments, the varying delay of the one or more pressure pulses may be altered in response to one or more measurements obtained within the second well 135, an adjacent well, or both. In one or more embodiments, the varying delay may be swept across a range of time between pulses, across a frequency range, or both.

Specific delays within the varying delay of the one or more pressure pulses corresponding to constructive interference at each perforation cluster, where each perforation cluster represents individual perforated intervals within the wellbore, may be stepped through while various response measurements are obtained downhole in real-time. This may occur by adjusting the pumping pressure response frequencies to be constructive with the reflections to target specific depths of each perforation interval individually. Each perforation cluster may consist of at least one perforation at a selected interval. There may be multiple perforation clusters spaced at regular and/or irregular intervals depending upon local formation and well parameters. Without limitations, the number of perforation clusters per stage may be in a range of about one to about twenty. In one or more embodiments, the number of perforation clusters for a single treatment stage may be between two and twelve.

Figure 2:
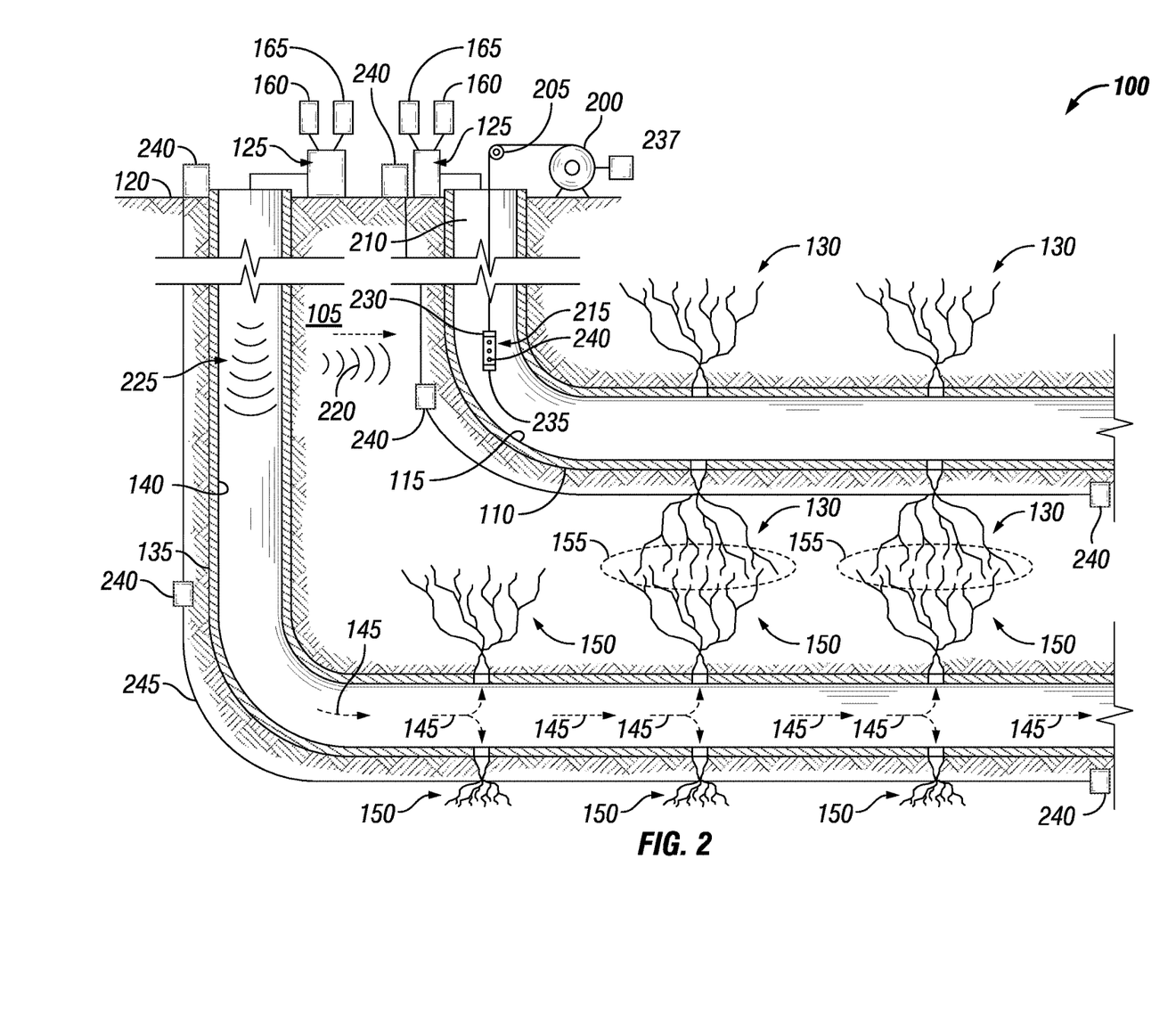
FIG. 2 illustrates a multi-lateral well system in a subterranean formation, in accordance with one or more embodiments of the present disclosure.

FIG. 2 illustrates a cross-section of the well system 100 in the subterranean formation 105. As illustrated, there may be a rotatable spool 200 disposed at the surface 120 coupled to a sheave 205 in order to raise and lower a cable 210 within the first well 110. In one or more embodiments, a tool 215 may be coupled to a distal end of the cable 210, wherein the tool 215 travels downhole or uphole as the rotatable spool 200 is rotated or actuated in a first direction or a second direction, respectively. The tool 215 may be disposed downhole using any suitable conveyance, such as, but not limited to, wireline, slickline, coiled tubing, solid rod, fiber optic cables, electrical conductors, and combinations thereof. In one or more embodiments, the tool 215 may be configured to measure one or more response signals 220 generated from one or more interactions of the one or more pressure excitation signals 225. In one or more embodiments, the tool 215 may be configured to or may measure one or more well parameters including, but not limited to, pressure, temperature, acoustic, temperature, strain, and combinations thereof. The tool 215 may comprise a transmitter 230, a receiver 235, and one or more sensors 240. As illustrated, the one or more sensors 240 may be disposed on or within the tool 215, but the one or more sensors 240 may be disposed at any suitable location including, but not limited to, at the surface 120, at a sub-surface about the first well 110, at a sub-surface about the second well 135, and any combination thereof. Without limitations, the one or more sensors 240 may be pressure sensors based on quartz-type sensors, strain-gauge sensors, optical sensors, electrical sensors, and combinations thereof. In one or more embodiments, the one or more sensors 240 may be configured to determine a well parameter.

As the electrical pump 160 generates one or more pressure excitation signals 225 in the second well 135 through the treatment fluid 145, the tool 215 may measure the corresponding one or more response signals 220 in the first well 110 with the receiver 235. The one or more response signals 220 may include one or more time-series pressure responses, one or more downhole acoustic measurements, one or more downhole strain measurements, one or more downhole temperature measurements, and any combination thereof, wherein the one or more response signals 220 are correlated with the one or more pressure excitation signals 225 to determine one or more formation responses, one or more cross-well communication indications, such as direct pressure communication or direct fluid communication between wells, or both. The formation responses may be a response measured from the subterranean formation 105 used to determine the extent of pressure communication or stress interference between the first well 110 and the second well 135. In one or more embodiments, stress interference may be correlated to a poroelastic behavior wherein the magnitude of a pressure signal measured in an adjacent well (for example, first well 110) may be significantly less than a pressure communication event, wherein a pressure communication event is the result of a direct pressure path being exposed between the wells resulting in sudden pressure changes and higher magnitude pressure changes.

As illustrated, a fiber optic cable 245 may be installed within the well system 100. The first well 110 and/or the second well 135 may utilize fiber optic cables 245, wherein the fiber optic cables 245 may be cemented in-place in an annular space between the subterranean formation 105 and a casing of each of the first well 110 and/or the second well 135. In alternate embodiments, the fiber optic cables 245 may be temporarily disposed downhole. In one or more embodiments, an electrical cable may be used instead of a fiber optic cable. In one or more embodiments, the fiber optic cables 245 may measure the one or more response signals 220 in the first well 110 and/or in the second well 135. In one or more embodiments, the one or more sensors 240 may be disposed along and/or about the fiber optic cables 245. Without limitations, the one or more sensors 240 may be pressure sensors capable of acquiring measurements at frequency rates of up to about 2,000 Hz. The fiber optic cables 245 may comprise one or more optical fibers. The one or more optical fibers may be single mode, multi-mode, and combinations thereof.

In one or more embodiments, the one or more response signals 220 may be measured as time-series data and matched to a treatment schedule of second well 135 to enable the precise time of operations to be established relative to a treatment and the treatment schedule. The time-series data may be processed to frequency domain data using a Fast Fourier Transform, further processed by using one or more wavelet transforms, or both. For example, in one or more embodiments an information handling system 237 may be coupled to the tool 215, wherein the transmitter 230 on the tool 215 may send the time-series data to the information handling system 237 for processing. In other embodiments, the information handling system 237 may be coupled to the fiber optic cables 245. As shown in FIG. 2, the information handling system 237 may be disposed at or about the surface 120.

Figure 3:
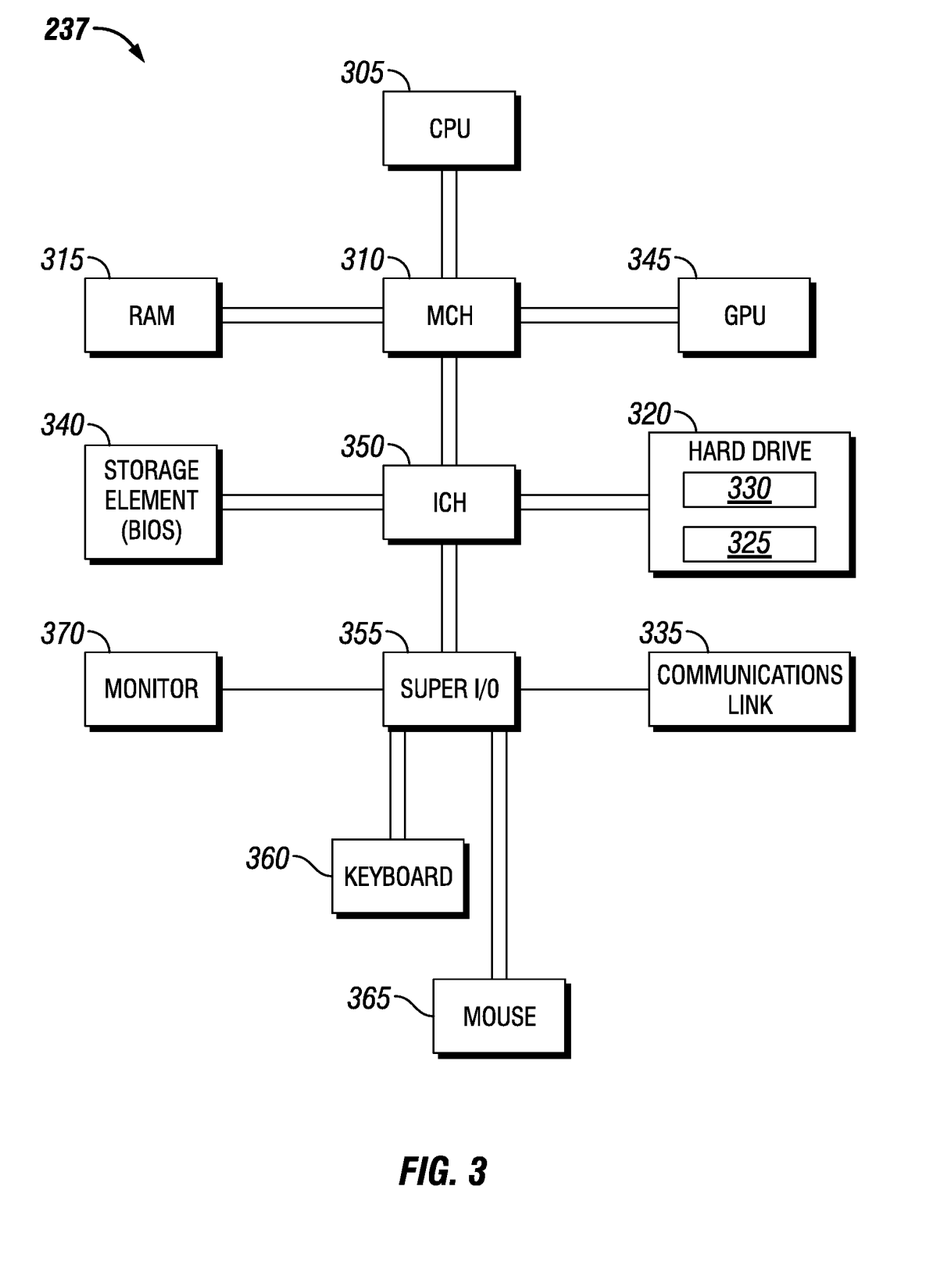
FIG. 3 illustrates an information handling system, in accordance with one or more embodiments of the present disclosure.

With reference now to FIG. 3, a diagram is shown illustrating an example information handling system 237, for example, for use with or by an associated well system 100 of FIGS. 1-2, according to one or more aspects of the present disclosure. A processor or central processing unit (CPU) 305 of the information handling system 237 is communicatively coupled to a memory controller hub (MCH) or north bridge 310. The processor 305 may include, for example a microprocessor, microcontroller, digital signal processor (DSP), application specific integrated circuit (ASIC), or any other digital or analog circuitry configured to interpret and/or execute program instructions and/or process data. Processor 305 may be configured to interpret and/or execute program instructions or other data retrieved and stored in any memory such as memory 315 or hard drive 320. Program instructions or other data may constitute portions of a software or application, for example application 325 or data 330, for carrying out one or more methods described herein. Memory 315 may include read-only memory (ROM), random access memory (RAM), solid state memory, or disk-based memory. Each memory module may include any system, device or apparatus configured to retain program instructions and/or data for a period of time (for example, non-transitory computer-readable media). For example, instructions from a software or application 325 or data 330 may be retrieved and stored in memory 315 for execution or use by processor 305. In one or more embodiments, the memory 315 or the hard drive 320 may include or comprise one or more non-transitory executable instructions that, when executed by the processor 305, cause the processor 305 to perform or initiate one or more operations or steps.

The information handling system 237 may be preprogrammed or it may be programmed (and reprogrammed) by loading a program from another source (for example, from a CD-ROM, from another computer device through a data network, or in another manner).

The data 330 may include treatment data, geological data, fracture data, microseismic data, or any other appropriate data. The one or more applications 325 may include a fracture design model, a reservoir simulation tool, a fracture simulation model, or any other appropriate applications. In one or more embodiments, a memory of a computing device includes additional or different data, application, models, or other information. In one or more embodiments, the data 330 may include treatment data relating to fracture treatment plans. For example, the treatment data may indicate a pumping schedule, parameters of a previous injection treatment, parameters of a future injection treatment, or one or more parameters of a proposed injection treatment. Such one or more treatment parameters may include information on flow rates, flow volumes, slurry concentrations, fluid compositions, injection locations, injection times, or other parameters. The treatment data may include one or more treatment parameters that have been optimized or selected based on numerical simulations of complex fracture propagation. In one or more embodiments, the data 330 may include geological data relating to one or more geological properties of the subterranean formation 105 (referring to FIG. 1). For example, the geological data may include information on the first well 110 and/or the second well 135 (referring to FIG. 1), completions, or information on other attributes of the subterranean formation 105. In one or more embodiments, the geological data includes information on the lithology, fluid content, stress profile (e.g., stress anisotropy, maximum and minimum horizontal stresses), pressure profile, spatial extent, or other attributes of one or more rock formations in the subterranean zone. The geological data may include information collected from well logs, rock samples, outcroppings, microseismic imaging, or other data sources. In one or more embodiments, the data 330 include fracture data relating to fractures in the subterranean formation 105. The fracture data may identify the locations, sizes, shapes, and other properties of fractures in a model of a subterranean zone. The fracture data can include information on natural fractures, hydraulically-induced fractures, or any other type of discontinuity in the subterranean formation 105. The fracture data can include fracture planes calculated from microseismic data or other information. For each fracture plan, the fracture data can include information (for example, strike angle, dip angle, etc.) identifying an orientation of the fracture, information identifying a shape (for example, curvature, aperture, etc.) of the fracture, information identifying boundaries of the fracture, or any other suitable information.

The one or more applications 325 may comprise one or more software applications, one or more scripts, one or more programs, one or more functions, one or more executables, or one or more other modules that are interpreted or executed by the processor 305. For example, the one or more applications 325 may include a fracture design module, a reservoir simulation tool, a hydraulic fracture simulation model, or any other appropriate function block. The one or more applications 325 may include machine-readable instructions for performing one or more of the operations related to any one or more embodiments of the present disclosure. The one or more applications 325 may include machine-readable instructions for generating a user interface or a plot, for example, illustrating fracture geometry (for example, length, width, spacing, orientation, etc.), pressure plot, hydrocarbon production performance. The one or more applications 325 may obtain input data, such as treatment data, geological data, fracture data, or other types of input data, from the memory 315, from another local source, or from one or more remote sources (for example, via the one or more communication links 335). The one or more applications 325 may generate output data and store the output data in the memory 315, hard drive 320, in another local medium, or in one or more remote devices (for example, by sending the output data via the communication link 335).

Modifications, additions, or omissions may be made to FIG. 3 without departing from the scope of the present disclosure. For example, FIG. 3 shows a particular configuration of components of information handling system 237. However, any suitable configurations of components may be used. For example, components of information handling system 237 may be implemented either as physical or logical components. Furthermore, in some embodiments, functionality associated with components of information handling system 237 may be implemented in special purpose circuits or components. In other embodiments, functionality associated with components of information handling system 237 may be implemented in configurable general-purpose circuit or components. For example, components of information handling system 237 may be implemented by configured computer program instructions.

Memory controller hub 310 may include a memory controller for directing information to or from various system memory components within the information handling system 237, such as memory 315, storage element 340, and hard drive 320. The memory controller hub 310 may be coupled to memory 315 and a graphics processing unit (GPU) 345. Memory controller hub 310 may also be coupled to an I/O controller hub (ICH) or south bridge 350. I/O controller hub 350 is coupled to storage elements of the information handling system 237, including a storage element 340, which may comprise a flash ROM that includes a basic input/output system (BIOS) of the computer system. I/O controller hub 350 is also coupled to the hard drive 320 of the information handling system 237. I/O controller hub 350 may also be coupled to an I/O chip or interface, for example, a Super I/O chip 355, which is itself coupled to several of the I/O ports of the computer system, including a keyboard 360, a mouse 365, a monitor 370 and one or more communications link 335. Any one or more input/output devices receive and transmit data in analog or digital form over one or more communication links 335 such as a serial link, a wireless link (for example, infrared, radio frequency, or others), a parallel link, or another type of link. The one or more communication links 335 may comprise any type of communication channel, connector, data communication network, or other link. For example, the one or more communication links 335 may comprise a wireless or a wired network, a Local Area Network (LAN), a Wide Area Network (WAN), a private network, a public network (such as the Internet), a WiFi network, a network that includes a satellite link, or another type of data communication network.

Figure 4:
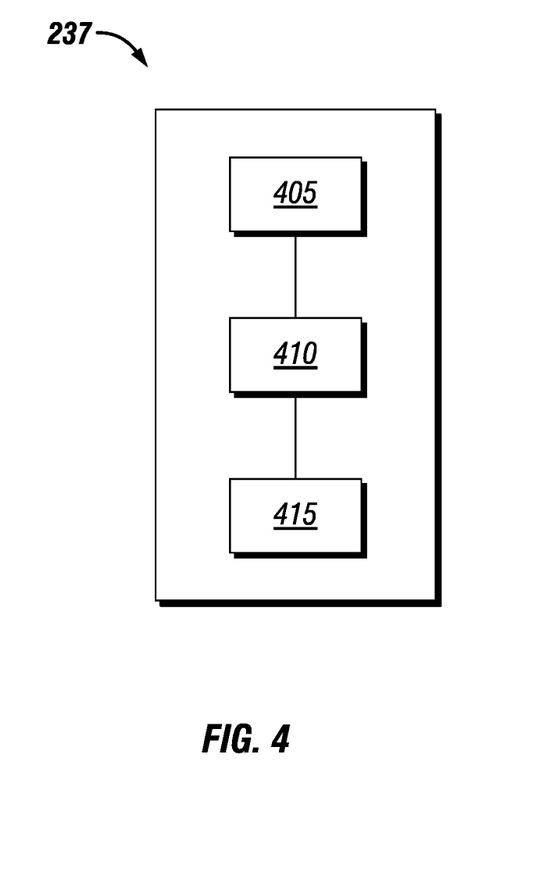
FIG. 4 illustrates modules within an information handling system, in accordance with one or more embodiments of the present disclosure.

The information handling system 237 may be configured to process the time-series data produced by the one or more response signals 220 (referring to FIG. 2) to determine one or more well parameters and/or formation responses, wherein the time-series data is obtained by the tool 215 (referring to FIG. 2), the fiber optic cables 245 (referring to FIG. 2), and combinations thereof. With reference to FIG. 4, the information handling system 237 may comprise a distributed temperature sensing (DTS) system 405, a distributed strain sensing (DSS) system 410, a distributed acoustic sensing (DAS) system 415, quasi-distributed sensing systems wherein multiple of the one or more sensors 240, that are single point sensors, are distributed along the fiber optic cables 245, and single point sensing systems wherein the one or more sensors 240 are located at the ends of the fiber optic cables 245.

Without limitations, the DTS system 405 may be configured to analyze amplitude of a signal, such as by using Raman scattering. In one or more embodiments, temperature measurements acquired by the DTS system 405 may be used to determine locations for fluid inflow in a treatment well (for example, the second well 135 on FIGS. 1-2) as the treatment fluid 145 (referring to FIGS. 1-2) from the surface is likely to be lower in temperature than temperatures of the subterranean formation 105 (referring to FIGS. 1-2). The DTS system 405 may determine fluid volume placement through warm-back analyses. Such analyses may be performed on water injections wells, fracturing fluid placement, and combinations thereof. Temperature measurements acquired in an observation well (for example, the first well 110 on FIGS. 1-2) may be used to determine fluid communication between the first well 110 and the second well 135, to determine fluid movement of the subterranean formation 105, and combinations thereof.

Without limitations, the DSS system 410 may use dynamic strain measurements based on interferometric sensors (for example, the one or more sensors 240 on FIG. 2) or static strain measurements using, but not limited to, Brillouin scattering. In one or more embodiments, static strain measurements may be used to determine propped fracture volume by observing deviations in strain measurements from a measured baseline before fracturing a stage, wherein a stage is an independent fracturing treatment. Without limitations, each stage may have a minimum of one perforation cluster, wherein a fracture is initiated at each perforation cluster. Static strain measurements may also be used to determine formation properties like permeability, poroelastic responses of the subterranean formation 105, leak-off rates based on the change of strain over time and the rate at which the strain changes over time, and combinations thereof. Dynamic strain measurements may be used in real-time to detect fracture growth through an inversion model. In one or more embodiments, actions to mitigate detrimental effects based on the dynamic strain measurements include, but are not limited to, dynamic changes to fluid flow rates in the treatment well (for example, the second well 135), the addition of diverters or chemicals into the treatment fluid 145, changes to proppant concentrations, changes to types of proppants used, and combinations thereof. In one or more embodiments, the DSS system 410 may be configured to measure pressure changes due to poroelastic responses of the subterranean formation 105, to measure changes in fracture growth rate due to changes in strain measurements, and combinations thereof.

Without limitations, the DAS system 415 may be configured to analyze phases of a signal, such as by using interferometric sensing with homodyne and/or heterodyne techniques where the DAS system 415 may sense phase and/or intensity changes due to constructive and/or destructive interference. DAS system 415 may be used to determine fluid allocation in real-time as acoustic noise is generated when the treatment fluid 145 (referring to FIGS. 1-2) is injected downhole into the subterranean formation 105. Phase and/or intensity based interferometric sensing systems may be sensitive to temperature, mechanical-induced vibrations, acoustically induced vibrations, and combinations thereof. Measurements acquired by the DAS system 415 may be converted from time-series data to frequency domain data using Fast Fourier Transforms (FFT) and other transforms such as, but not limited to, wavelet transforms. Various frequency ranges may be used for different purposes. In one or more embodiments, low frequency signal changes may be attributed to formation strain changes or fluid movement, and other frequency ranges may be indicative if fluid and/or gas movement. Various filtering techniques may be applied to generate indicators of events than may be of interest. Without limitations, such indicators of events may include formation movement due to growing natural fractures, formation stress changes during fracturing operations (referred to herein as "stress shadowing"), fluid seepage during fracturing operations as formation movement may force the treatment fluid 145 into an observation well (for example, first well 110 on FIGS. 1-2) where the fluid seepage may be detected, fluid flow from fractures, fluid and proppant flow from frac hits, and combinations thereof. Each indicator may have a characteristic signature in terms of frequency, amplitude, and/or time-dependent behavior. The DAS system 415 may be used to detect various seismic events where stress fields and/or growing fracture networks generate microseimic events or where perforating a well may be used to determine travel time between horizontal wells. The measurements obtained by the DAS system 415 may be used from stage to stage to determine changes in travel time as the subterranean formation 105 is fractured and filled with the treatment fluid 145. The DAS system 415 may be used in conjunction with seismic sources (for example, the one or more sensors 240) disposed at the surface 120 (referring to FIGS. 1-2) to generate vertical seismic profiles before, during, after, and combinations thereof of a fracturing treatment to determine the effectiveness of the fracturing treatment as well as production effectiveness. In one or more embodiments, the DAS system 415 may be configured to measure changes in fracture growth rate due to changes in microseismic measurements, to measure microseismic events caused by changes in stress fields in the subterranean formation 105, and combinations thereof.

In one or more embodiments, the quasi-distributed sensing systems may utilize Fiber Bragg Gratings (FBGs) to detect a wavelength shift. In one or more embodiments, the quasi-distributed sensing systems may utilize the FBGs to form a Fabry-Perot type interferometric system for phase-based measuring. The FBGs may be used as temperature sensors, strain sensors, interferometric sensors with high sensitivity, and combinations thereof. The FBGs may be incorporated into the fiber optic cables 245 (referring to FIG. 2) and may be compatible with the DTS system 405, DSS system 410, and DAS system 415. In one or more embodiments, the FBGs may use wavelength division multiplexing.

In one or more embodiments, the single point sensing systems may utilize the Fabry-Perot type interferometric system, FBGs, other intensity-based sensors, and combinations thereof. The one or more sensors 240 (referring to FIG. 2) of the single point sensing systems may be disposed in the first well 110 (referring to FIGS. 1-2), in the second well 135 (referring to FIGS. 1-2), at the surface 120 (referring to FIGS. 1-2), and combinations thereof. The measurements obtained by the one or more sensors 240 may be used to determine well communication between adjacent wells (for example, first well 110 and second well 135), and a treatment schedule of at least one of the wells may be changed based on the measurements. In one or more embodiments, the single point sensing systems and/or the quasi-distributed sensing systems may be configured to obtain and/or process pressure measurements.

As the information handling system 237 processes the time-series data, an operator may perform treatment operations on a designated well based on said time-series data. With reference back to FIG. 2, the one or more pressure excitation signals 225 may be coordinated with changes in one or more fracturing treatment parameters such as proppant concentration, changes in proppant concentration, one or more chemical additives or additive concentrations, one or more diverters, and any combination thereof to further enhance a formation response to the pressure excitation signal. The one or more pressure excitation signals 225, changes in one or more fracturing treatment parameters, and the one or more response parameters (for example, pressure transmission events or pressure reflections) may be used to update one or more control algorithms for a fracturing treatment, wherein the operation of the fracturing treatment is dynamically updated. A correlation between the one or more pressure excitation signals 225, time-series data, and one or more response signals 220 may then be used to update fracturing operation target parameters, such as, but not limited to, a treatment injection rate, proppant concentration, chemical additive concentrations and/or diversion stages and control models used in an operating system of information handling system 237 to deploy appropriate stages (for example, fracturing treatments) based upon the one or more pressure excitation signals 225.

In one or more embodiments, acoustic measurements obtained from the tool 215, the fiber optic cables 245, and combinations thereof may be used for microseismic event detection of one or more microseismic events, where one or more microseismic events are caused as the rock fractures. The acoustic measurements may be used to determine fracture length, azimuth, growth rates, and any combinations thereof for individual rock fractures.

In other embodiments, strain measurements obtained from the tool 215, the fiber optic cables 245, and combinations thereof may be used to measure fracture growth, fracture complexity, or both for individual rock fractures, wherein the strain measurements are a measurement of the mechanical deformation of a wellbore in response to the changes in rock volume caused by adjacent well fracturing.

In one or more embodiments, temperature measurements obtained from the tool 215, the fiber optic cables 245, and combinations may be used as an indication of fluid flow of treatment fluid 145 and thus an early indication of cross-well communication between the first well 110 and the second well 135. In more embodiments, one or more response signals 220 obtained from the tool 215, the fiber optic cables 245, and combinations may be used as an indicator for, but not limited to, fracture growth, fracture boundaries by measuring resonance frequencies, fracture opening pressure, fracture closing pressure, one or more properties that may indicate permeability, and any combinations thereof for individual rock fractures.

In one or more embodiments, an operator may perform one or more actions to mitigate well interference between the second well 135 and the first well 110 based, at least in part, on monitoring potential well interference after the generation of the one or more pressure excitation signals 225, the acquisition of measurements from the one or more response signals 220, and the processing of the time-series data with well parameters to determine formation responses. Such one or more actions to mitigate well interference may include, but are not limited to, decreasing the fluid injection rate, pressure, or both of the treatment fluid 145 in the second well 135 while increasing the rate, pressure, or both within the first well 110 to target one or more identified high risk well interference events (for example, direct pressure communication or direct fluid communication between wells, injecting one or more mechanical diverters downhole, injecting one or more chemicals, pumping a separate fluid in either the first well 110 or the second well 135, changing proppant concentration, changing the size distribution of the proppants, changing chemical composition of one or more fluids (for example, treatment fluid 145) to change the viscosity and associated pressure drop of one or more fluids in the subterranean formation 105, and any combination thereof. In one or more embodiments, the one or more actions may mitigate well interference after detecting the potential well interference by analyzing the time-series data produced as a result of the one or more pressure excitation signals 225.

An embodiment of the present disclosure is a method to determine well communication, comprising: generating one or more pressure excitation signals via an electrical pump in a first well, wherein the one or more pressure excitation signals produce one or more response signals based on the one or more pressure excitations signals interacting with a subterranean formation; measuring the one or more response signals through transmission of the one or more response signals to a second well with a fiber optic cable, wherein the one or more response signals are measured as time-series data; determining a formation response by processing the one or more response signals with an information handling system; determining a well parameter via one or more sensors; and performing a treatment operation to influence fracturing and production related communication between the first well and the second well.

In one or more embodiments described in the preceding paragraph, the method further comprising measuring the one or more response signals through reflection of the one or more response signals in the first well. In one or more embodiments described above, wherein the information handling system comprises: a distributed temperature sensing (DTS) system; a distributed strain sensing (DSS) system; and a distributed acoustic sensing (DAS) system. In one or more embodiments described above, wherein the information handling system is configured to analyze the one or more response signals, wherein the one or more response signals are pressure measurements. In one or more embodiments described above, wherein the DSS system is configured to analyze the one or more response signals, wherein the one or more response signals are strain measurements. In one or more embodiments described above, wherein the DSS system is configured to detect fracture growth through an inversion model in real-time, wherein the one or more response signals are dynamic strain measurements. In one or more embodiments described above, wherein the DAS system is configured to analyze phase, amplitude, frequency, and combinations thereof of the one or more signals, wherein the one or more response signals are acoustic measurements, to detect seismic events wherein stress fields or growing fracture networks generate microseismic events. In one or more embodiments described above, the method further comprising converting the time-series data to frequency domain data using Fast Fourier Transforms (FFT) or wavelet transforms. In one or more embodiments described above, wherein the one or more pressure excitation signals comprise a step change in pressure, a time-variant gradual pressure change with varying periodicity, a pressure pulse train with varying delay between pressure pulses, a pressure change induced by a change of a composition of a fluid, and any combination thereof. In one or more embodiments described above, the method further comprising of adjusting an injection rate of the electrical pump to vary the delay between one or more pressure pulse trains. In one or more embodiments described above, the method further comprising of dynamically updating one or more control algorithms for the treatment operation, wherein treatment operation is fracturing a stage. In one or more embodiments described above, the method further comprising: disposing a tool downhole in the second well using a conveyance, wherein the conveyance includes a fiber optic cable, wherein the tool comprises a receiver and a transmitter, wherein the one or more sensors are disposed on the tool; measuring the one or more response signals with the receiver or the fiber optic cable; and transmitting the measured one or more response signals to the information handling system with the transmitter. In one or more embodiments described above, wherein the one or more sensors are disposed at a surface of the first well, a surface of the second well, and combinations thereof. In one or more embodiments described above, wherein the one or more sensors are along and at the ends of the fiber optic cable.

Another embodiment of the present disclosure is a system to determine well communication, comprising: an electrical pump, wherein the electrical pump is fluidly coupled to a first well, wherein the electrical pump is configured to generate one or more pressure excitation signals; one or more sensors; a fiber optic cable, wherein the fiber optic cable is disposed about a second well, wherein the one or more sensors are disposed along and at the ends of the fiber optic cable; an information handling system, wherein the information handling system is disposed at a surface, wherein the information handling system comprises: a distributed temperature sensing (DTS) system; a distributed strain sensing (DSS) system; and a distributed acoustic sensing (DAS) system.

In one or more embodiments described in the preceding paragraph, wherein the information handling system further comprises: quasi-distributed sensing systems, wherein the quasi-distributed sensing systems comprise Fiber Bragg Gratings; and single point sensing systems. In one or more embodiments described above, the system further comprising a tool, wherein the tool comprises a transmitter, a receiver, and one or more sensors. In one or more embodiments described above, the system further comprising a fiber optic cable disposed about the first well, wherein the fiber optic cable disposed about the first well comprises one or more sensors are disposed along and at the ends of the fiber optic cable. In one or more embodiments described above, the system further comprising an electrical blender, wherein the electrical blender is configured to generate the one or more pressure excitation signals in conjunction with the electrical pump.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (for example, "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method to determine well communication, comprising:
    generating one or more pressure excitation signals via an electrical pump in a first well after performing a fracturing treatment to the first well, wherein the one or more pressure excitation signals produce one or more response signals based on the one or more pressure excitations signals interacting with a subterranean formation;
    measuring the one or more response signals through transmission of the one or more response signals to a second well with a fiber optic cable, wherein the one or more response signals are measured as time-series data;
    determining a formation response by processing the one or more response signals with an information handling system;
    determining a well parameter via one or more sensors; and
    performing a treatment operation to influence fracturing and production related communication between the first well and the second well.

2. The method of claim 1, further comprising measuring the one or more response signals through reflection of the one or more pressure excitation signals in the first well.

3. The method of claim 1, wherein the information handling system comprises at least one of:
    a distributed temperature sensing (DTS) system;
    a distributed strain sensing (DSS) system; and
    a distributed acoustic sensing (DAS) system.

4. The method of claim 3, wherein the information handling system is configured to analyze the one or more response signals, wherein the one or more response signals are pressure measurements.

5. The method of claim 3, wherein the DSS system is configured to analyze the one or more response signals, wherein the one or more response signals are strain measurements.

6. The method of claim 3, wherein the DSS system is configured to detect fracture growth through an inversion model in real-time, wherein the one or more response signals are dynamic strain measurements.

7. The method of claim 3, wherein the DAS system is configured to analyze phase, amplitude, frequency, and combinations thereof of the one or more signals, wherein the one or more response signals are acoustic measurements, to detect seismic events wherein stress fields or growing fracture networks generate microseismic events.

8. The method of claim 1, further comprising converting the time-series data to frequency domain data using Fast Fourier Transforms (FFT) or wavelet transforms.

9. The method of claim 1, wherein the one or more pressure excitation signals comprise a step change in pressure, a time-variant gradual pressure change with varying periodicity, a pressure pulse train with varying delay between pressure pulses, a pressure change induced by a change of a composition of a fluid, and any combination thereof.

10. The method of claim 9, further comprising of adjusting an injection rate of the electrical pump to vary the delay between one or more pressure pulse trains.

11. The method of claim 1, further comprising of dynamically updating one or more control algorithms for the treatment operation, wherein treatment operation is fracturing a stage.

12. The method of claim 1, further comprising:
disposing a tool downhole in the second well using a conveyance, wherein the conveyance includes a fiber optic cable, wherein the tool comprises a receiver and a transmitter, wherein the one or more sensors are disposed on the tool;
measuring the one or more response signals with the receiver or the fiber optic cable; and
transmitting the measured one or more response signals to the information handling system.

13. The method of claim 1, wherein the one or more sensors are disposed at a surface of the first well, a surface of the second well, and combinations thereof.

14. The method of claim 1, wherein the one or more sensors are along and at the ends of the fiber optic cable.

15. A system to determine well communication, comprising:
an electrical pump, wherein the electrical pump is fluidly coupled to a first well, wherein the electrical pump is configured to generate one or more pressure excitation signals after performing a fracturing treatment to the first well;
one or more sensors;
a fiber optic cable, wherein the fiber optic cable is disposed about a second well, wherein the one or more sensors are disposed along and at the ends of the fiber optic cable;
an information handling system, wherein the information handling system is disposed at a surface, wherein the information handling system comprises at least one of:
a distributed temperature sensing (DTS) system;
a distributed strain sensing (DSS) system; and
a distributed acoustic sensing (DAS) system,
wherein the information handling system is operable to:
generate the one or more pressure excitation signals via the electrical pump wherein the one or more pressure excitation signals produce one or more response signals based on the one or more pressure excitations signals interacting with a subterranean formation;
measure the one or more response signals through transmission of the one or more response signals to the second well with the fiber optic cable, wherein the one or more response signals are measured as time-series data;
determine a formation response by processing the one or more response signals;
determine a well parameter via the one or more sensors; and
instruct the perform of a treatment operation to influence fracturing and production related communication between the first well and the second well.

16. The system of claim 15, wherein the information handling system further comprises:
quasi-distributed sensing systems, wherein the quasi-distributed sensing systems comprise Fiber Bragg Gratings; and
single point sensing systems.

17. The system of claim 15, further comprising a tool, wherein the tool comprises a transmitter, a receiver, and one or more sensors.

18. The system of claim 15, further comprising a fiber optic cable disposed about the first well, wherein the fiber optic cable disposed about the first well comprises one or more sensors are disposed along and at the ends of the fiber optic cable.

19. The system of claim 15, further comprising an electrical blender, wherein the electrical blender is configured to generate the one or more pressure excitation signals in conjunction with the electrical pump.

* * * * *